United States Patent
Solheim et al.

[19]

[11] Patent Number: 5,937,569
[45] Date of Patent: Aug. 17, 1999

[54] ASCENDING FISHING LURE

[76] Inventors: Michael Solheim, 4525 Nathan La. N. #207, Plymouth, Minn. 55442; Dennis J. Burns, 901 Summit Ave., Saint Paul Park, Minn. 55071

[21] Appl. No.: 09/018,417

[22] Filed: Feb. 4, 1998

Related U.S. Application Data

[60] Provisional application No. 60/044,142, Apr. 22, 1997.

[51] Int. Cl.$^6$ .................................................. A01K 85/00
[52] U.S. Cl. ....................... 43/42.47; 43/42.49; 43/42.33
[58] Field of Search ................ 43/42.47, 42.49, 43/42.33, 44.96, 44.97, 4.5, 42.03, 42.22, 44.95, 44.89

[56] References Cited

U.S. PATENT DOCUMENTS

| | | | |
|---|---|---|---|
| 399,866 | 3/1889 | Gage | 43/44.89 |
| 1,886,116 | 11/1932 | Nolan | 43/42.22 |
| 2,189,487 | 2/1940 | Davenport | 43/42.22 |
| 2,459,959 | 1/1949 | Pelmarsh | 43/44.89 |
| 2,589,715 | 3/1952 | Lysikowski | 43/44.89 |
| 2,611,207 | 9/1952 | Pond | 43/42.22 |
| 3,638,347 | 2/1972 | Kochevar | 43/42.39 |
| 3,727,339 | 4/1973 | Le Master | 43/42.22 |
| 4,445,294 | 5/1984 | Gowing | 43/42.47 |
| 4,731,948 | 3/1988 | Helton | 43/42.33 |
| 4,738,047 | 4/1988 | Ryan | 43/42.25 |
| 4,750,289 | 6/1988 | Rossa | 43/44.96 |
| 4,807,387 | 2/1989 | Dougherty, Jr. et al. | 43/42.09 |
| 4,862,631 | 9/1989 | Wilson et al. | 43/42.33 |
| 5,191,731 | 3/1993 | Peterson | 43/42.36 |
| 5,265,368 | 11/1993 | Taylor | 43/42.06 |
| 5,554,659 | 9/1996 | Rosenblatt | 521/51 |

FOREIGN PATENT DOCUMENTS

| | | | |
|---|---|---|---|
| 513204 | 5/1955 | Canada | 43/42.47 |
| 703164 | 4/1931 | France | 43/42.47 |
| 2422328 | 11/1979 | France | 43/42.47 |

*Primary Examiner*—Kurt Rowan
*Assistant Examiner*—Fredrick T. French, III
*Attorney, Agent, or Firm*—Larkin, Hoffman, Daly & Lindgren, Ltd.

[57] ABSTRACT

An ascending fishing lure comprising a conventional fishing lure body with an upwardly-angled bill—the fishing line being attached beneath the bill at a point between the base of the bill and the belly of the lure body—so that tension on the line causes the lure to move forward and ascend in a controllable manner. The bill may be a generally planar configuration, or comprise a Z-shaped, tiered, or other non-uniform configuration. The lure is preferably used with a counterweight on the line disposed in front of and beneath the lure.

21 Claims, 3 Drawing Sheets ized that 5,937,569

ASCENDING FISHING LURE

RELATED APPLICATIONS

This application is a continuation-in-part of and claims the benefit of priority under 35 USC §120 from the provisional application filed Apr. 22, 1997 under Ser. No. 60/044,142 entitled Ascending Fishing Lure by the named inventors herein.

BACKGROUND OF THE INVENTION

1. Field of the Invention

The present invention relates to fishing lures, and particularly to lures which ascend due to forward line tension.

2. Brief Description of the Prior Art

Various types of fishing lures are known to the art, each having features and advantages which are appreciated as making them particularly suited for attracting different types of game fish or simulating certain activities or characteristics exhibited by live bait or fish in their natural environments.

Many varieties of lures having downwardly-depending front bills or vanes which dive under forward line tension are well known, however those skilled in the art have not developed commercially suitable lures which ascend under forward line tension.

Some "non-diving" lures or lures with upwardly angled or curved bills are known to the art, with some representative examples being shown in U.S. Pat. Nos. 4,862,629 and 4,738,047 to Ryan, U.S. Pat. No. 4,141,171 to Muddiman, U.S. Pat. No. 2,608,016 to Shipley, and U.S. Pat. No. 1,600,653 to Steenstrup.

These references also disclose the some of the drawbacks or defects in existing lure designs. For example, in the Ryan '629 and '047 patents, as well as the Muddiman '171 patent, the line is either attached at or near the front or upper tip of the bill, or threaded through an eyelet or aperture disposed at the tip of the bill. Forward line tension causes these lures to track along the vector defined primarily by the direction of the line, as affected by the bouyancy or weight of the lure. Forward tension using a weighted line will still cauuse these lures to drop or dive along the path of the line. They will only ascend or rise when the line tension is applied at an upward angle relative to the center of mass and the horizontal axis of the lure.

In contrast, Shipley '016 attaches the line to a separate eyelet with a clevis, and provides a bill which can be pivoted between various downward or upward angles. The bill adjustment mechanism utilized in Shipley '016 is far too heavy to be used practically in a commercial game lure, since the heavy front weight would counteract the neutral bouyancy of the lure body. Even if this condition were corrected by the use of a mechanism which maintained neutral bouyancy—or eliminated by having a fixed-position bill—Shipley '016 still places the eyelet and clevis above the bill, so that even when the bill is angled upwardly the lure will at best follow the same vector defined by the path of the line when forward tension is applied. Consequently, Shipley '016 may provide some depth adjustability as described, but is not suitable for producing a rapid or controlled ascending motion of the lure under forward tension.

In Steenstrup '653, a series of line-attaching apertures in provided along a vertically-oriented flange or rib mounted along the underside of the bill. The bill is pivotally attached and may assume a variety of upward angles, and has a downwardly curved tip which covers the flange or rib. In operation, however, the Steenstrup '653 lure operates in substantially the same manner as those described above. If the line is attached to one of the forward apertures, the bill aligns itself along the vector defined by the path of the line tension, and the lure simply trails the line path in whatever direction the tension is being applied. If the line is attached to an intermediate aperture, the line tension plus water pressure on the curved tip of the bill causes the the bill to pivot downwardly until the tip contacts the line, and once the flange and bill are aligned with the line the lure will follow the path of the line, or descend slightly due to the curved tip of the bill. Finally, if the line is attached to the most proximate aperture, that aperture and the pivot point of the bill will be aligned along the path of the line and the longitudinal axis of the lure. As a result, the bill will at best pivot to a vertical position as shown in FIG. 1 of the Steenstrup '653 patent—thus causing the lure to rotate about its longitudinal axis and buck or gyrate in an uncontrolled manner due to its orientation and curved shape—or at best will pivot to a rearwardly angled position as shown in FIG. 2 of the Steenstrup '653 patent and cause the lure either to descend under tension or to buck uncontrollably as the lure rotates.

It is therefore the object of this invention to design a game fishing lure which will ascend in a controlled manner under forward line tension, and ascend rapidly under stronger forward line tension, especially when that line is counterweighted. Such a lure of this invention thereby permits a fisherman to mimic a similar bait fish (such as a minnow) moving near the bottom surface of a lake or stream, either along a relativelty straight or constant-depth path parallel with the bed, or with occassional rapid ascents to mimic the bait fish avoiding potential predators obscured from view by weeds or other debris or obstacles. Alternately, the ascending lure can be used with a counterweight to mimic a small bait fish feeding near the water's surface.

SUMMARY OF THE INVENTION

Briefly described, the ascending lure of this invention provides a conventional fishing lure body with an upwardly-angled bill, the line being attached beneath the bill at a point between the base of the bill and the lower belly of the lure body, so that forward tension on the line causes the lure to ascend rapidly and in a controllable manner. The bill may take the form of a generally planar configuration, or comprise a Z-shaped, tiered, or other non-uniform configuration.

One advantages of the ascending lure of this invention is to allow the lure to be used with a counterweighted line, and with constant forward tension on the line (using trolling or spool retreival capabilities) to permit the lure to travel through the water at a fixed distance from the bottom surface of a lake or stream.

Other advantages which can be obtained from the ascending lure in the hands of capable fisherman include the ability to mimic the natural movement of live bait fish in their natural habitat, such as dipping and rising near the bottom of a lake or steam as the fish encounters obstacles or potential predators obscured in the weeds or debris, as well as simulating a smaller fish feeding near the surface of the water, or naturally moving in an up-and-down path through the water.

Since many game fish will strike from directly behind or behind and beneath the bait fish, a lure which travels at a relatively fixed distance above the weeds or bed surface, or which ascends at the time of or just before a strike, will increase the likelihood that the lure will remain in line with the game fish's normal trajectory for a slightly longer period of time (enhancing the likelihood of a clean swallow and more secure hook set), as well as placing the lighter background of the surface and sky behind the lure rather than the darker water or bottom surface (thus making a monofilament line even more difficult to detect, and increasing the chances that the normally depending belly hook will be obscured from view by the body of the lure and the tail hook will be more in line with the body of the lure).

DETAILED DESCRIPTION OF THE PREFERRED EMBODIMENTS

The lure of this invention and its method of use are illustrated in FIGS. 1–11, and the invention is referenced generally therein by the numeral 10. The lure, its method of use, components, and techniques described herein for its fabrication are generally referred to interchangeably in this specification as the lure 10 for convenience.

Figure 1:
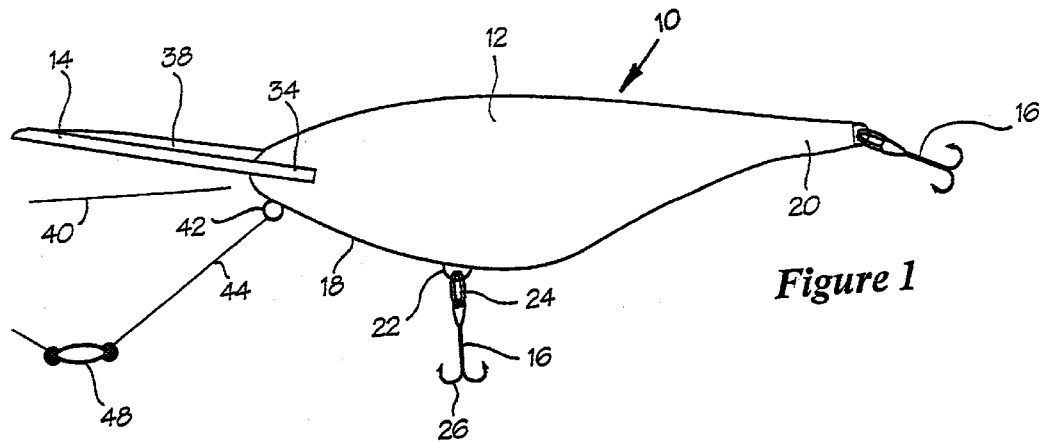
FIG. 1 is a side elevation view of one embodiment of the lure of this invention showing an upwardly-angled bill having a generally planar configuration.
Figure 4:
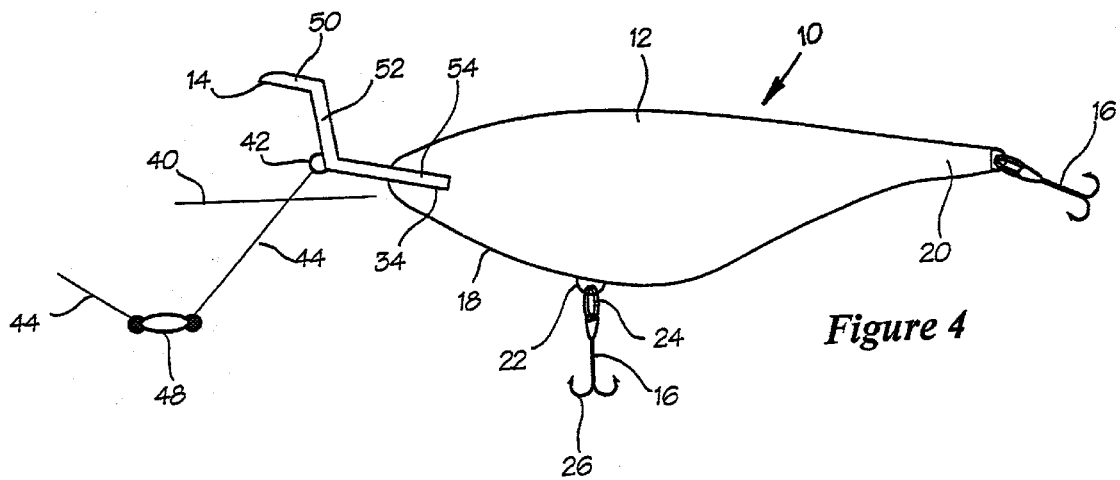
FIG. 4 is a side elevation view of one embodiment of the lure of this invention showing an upwardly-angled bill having a generally Z-shaped configuration.

Referring particularly to FIGS. I and 4, the lure 10 consists of a body 12 and a forwardly projecting bill 14. The body 12 has a plurality of hook assemblies 16 attached to the belly 18 and tail 20. Each hook assembly 16 comprises a fixed eyelet 22 securely mounted or attached to the body 12, a link ring 24, and a single-, double-, or treble-tined hook 26. The body 12 of the lure may be fabricated from any conventional natural or synthetic material such as balsa, fiberglass, polystyrene, or the like, and is painted or patterned to simulate a particular live bait fish or to produce certain known stimulus among the target game fish. The shape and dimensions of the body 12 of the lure 10 shown in FIGS. 1 and 4 is based upon and patterned after the bodies 12 of commercially available Rapala® Shad Rap® Deep Runner Model SR-5 SB and Shallow Runner Model SSR-7 SD manufactured by Rapire Teo of Inverin, County Galway, Ireland (also under the Normark™ name and logo) and distributed in the United States. These lures 10 have an overall length of approximately 7 cm. excluuding the bill 14, and weight of approximately 6 g. including the hook assemblies 14. The body 12 is preferably weighted or fabricated so as to be very close to neutral bouyancy in fresh water, and with a center of mass disposed so that the body 10 remains relatively close to a horizontal orientation in the water.

Figure 2:
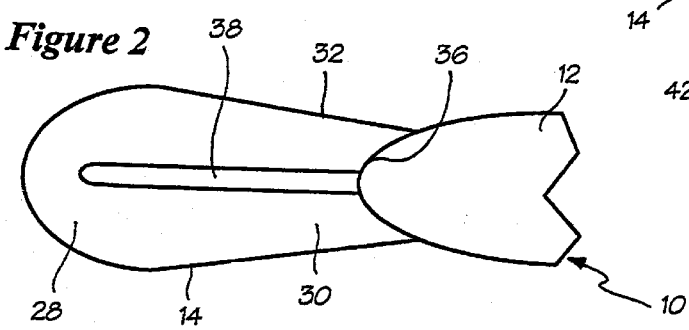
FIG. 2 is a partially broken away top view of the lure body and bill of FIG. 1.
Figure 3:
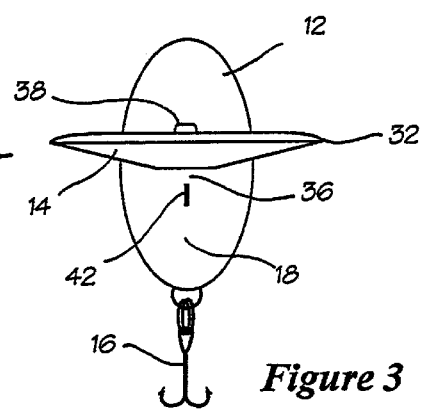
FIG. 3 is a front end view of the front portion of the lure body and bill of FIG. 1.

Referring particularly to FIGS. 1–3, an embodiment of the lure 10 in which the bill 14 is generally planar is shown from the side, top, and front. The bill 14 has a generally semi-circular front or distal section 28, and a tapered proximal section 30. The edges 32 of each section 28, 30 are generally beveled or radiused. The end of the proximal section 30 of the bill 14 is inserted into a groove or channel 34 in the distal tip 36 of the body 12 as secured or fastened therein using adhesive or another conventional mounting method. The bill 14 is preferably clear or translucent, and fabricated from a synthetic polymer or plastic material such as polystyrene. The bill 14 may also include an upstanding rib 38 projecting longitudinally along the top surface of the bill 14, which provides longitudinal reinforcement, stabilizes the bill 14 against travsverse or lateral movement when the rib 38 extends into and is fastened within the body 14, serves as a directional fin, and may optional facilitate fabrication of other embodiments as described herein.

The planar bill 14 shown in FIG. 1 has a length on the order of approximately 2.5 cm. to 3 cm. measured from the distal tip 36 of the body 14, and a thickness on the order of 0.2 cm. exclusing the rib 38. The bill 14 projects or in angled upwardly relative to the natural longitudinal axis 40 of the lure 10, which is defined operationally herein as the vector line along which the lure 10 would normally traverse under tension applied to the eyelet 42 to which the fishing line 44 is attached, given the center of mass of the body 12, the position on the body 12 of the eyelet 42 relative to that center of mass, and the particular shape and corresponding hydrodynamic flow characteristics around the body 12.

Figure 5:
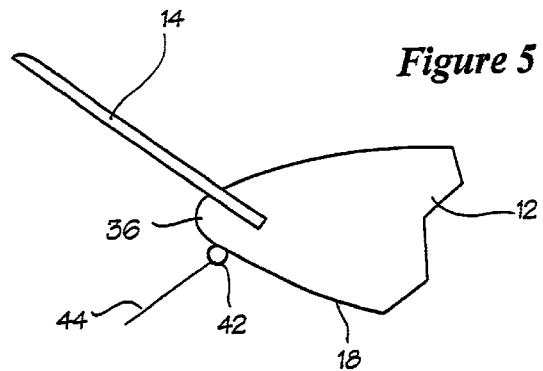
FIG. 5 is a partially broken away side elevation view of an alternate embodiment of the lure of FIG. 1 showing the bill at a greater upward angle.
Figure 6:
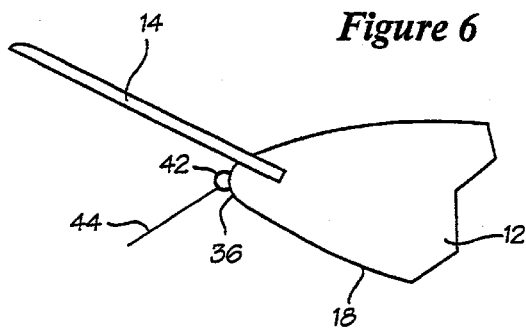
FIG. 6 is a partially broken away side elevation view of an alternate embodiment of the lure of FIG. 1 showing the line attached to an eyelet at the distal tip of the lure body.
Figure 7:
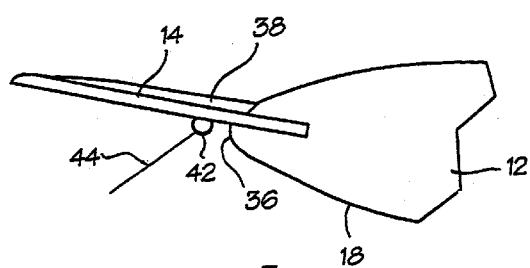
FIG. 7 is a partially broken away side elevation view of an alternate embodiment of the lure of FIG. 1 showing the line attached to an eyelet disposed on the underside of the bill proximate to the base thereof.
Figure 8:
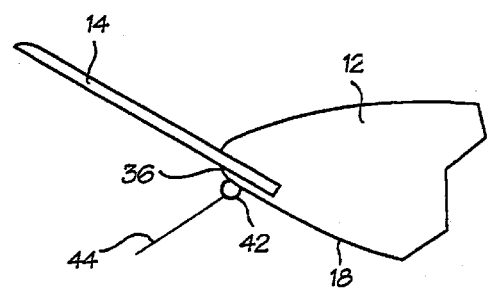
FIG. 8 is a partially broken away side elevation view of an alternate embodiment of the lure of FIG. 1 showing the line attached to an eyelet at the distal tip of the lure body, and the bill extending upwardly from a position generally tangiential to the belly of the lure body.

Referring particularly to FIGS. 5–8, various alternate embodiments are shown utilizing the planar bill 14. In FIG. 5, the eyelet 42 is attached slightly below the distal tip 36 of the body 12, and the bill 14 extends upwardly at a greater angle relative to the normal longitudinal axis 40 than the embodiment of FIG. 1. In FIG. 6, the eyelet 42 is attached at the distal tip 36 of the body 12, and the bill 14 projects at an intermediate angle. In FIG. 7, the eyelet 42 is attached to the underside of the bill 14 proximate to the base thereof and the distal tip 36 of the body 12. In this embodiment, the upstanding rib 38 disposed on the upper surface of the bill 14 is shown, which provides additional thickess to anchor the eyelet 42 to the bill, and to permit a an extension of the eyelet 42 to traverse rearwardly inside the bill 14 to a point within the body 12 of the lure 10 for a more secure engagement. In FIG. 8, the eyelet 42 is similarly attached slightly below the distal tip 36 of the body 12, and the bill 14 is oriented generally tangentially to the belly region 46 of the body 12 and attached closer to the underside of the body 12.

In each of these embodiments, the lure 10 can be and preferably is used with a counterweight 48 attached to the line 44, positioned a suitable distance from the lure 10 depending upon the existing environmental conditions, the weight of the counterweight 48, size and bouyancy of the lure 10, and the characteristics or mannerisms intended to be imparted to the lure 10 by the fisherman. A rough distance between the counterweight 48 and lure 10 of approximately 2' to 3' is envisioned as suitable for a wide variety of applications.

Referring to FIG. 4, a Z-shaped or multi-tiered embodiment of the bill 14 is shown on a similar body 12. The Z-shaped bill 14 includes a distal section 50, an intermediate section 52, and a proximal section 54 that is secured to the body 12 in the same manner as described above. The proximal section 54 can extend from the distal tip 36 of the body 12, or can be disposed entirely within the body 12. The height and length of the Z-shaped bill 14 will thereby be characterized by the lengths of the three sections 50, 52, 54, and the relative angles therebetween. The Z-shaped bill 14 of FIG. 4 has an intermediate section 52 of approximately 1 cm. length, and a distal section 50 of approximately 0.5 cm. length. The obtuse angle between the intermediate section 52 and the proximal section 54 is slightly greater than 90°, on the order of approximately 100° to 110°, and the obtuse angle between the distal section 50 and the intermediate section 52 is slightly greater, on the order of approximately 110° to 120°.

Figure 9:
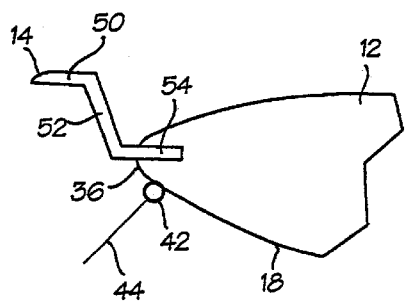
FIG. 9 is a partially broken away side elevation view of an alternate embodiment of the lure of FIG. 2 showing the distal and proximal portions of the Z-shaped bill aligned generally parallel with the longitudinal axis of the lure body.
Figure 10:
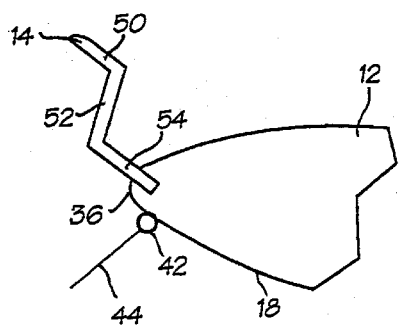
FIG. 10 is a partially broken away side elevation view of an alternate embodiment of the lure of FIG. 2 showing the Z-shaped bill oriented at a greater upward.

Referring to FIGS. 9 and 10, two alternate orientations of the Z-shaped bill 14 are shown, ranging from the "horizontal" position shown in FIG. 9 to the much more steeply angled orientation shown in FIG. 10. In FIG. 4, the eyelet 14 is shown attached to the bill 14 at the juncture between the intermediate section 52 and the proximal section 54. In both FIGS. 9 and 10, the eyelet 42 is shown for convenience disposed slightly below the distal tip 36 of the body. As with the planar bill 14 embodiments, the eyelet 42 may similarly be situated or located at any point from the belly region 46 to the distal tip 36 of the body 12, or the underside of the bill 14, so long as the position of the eyelet 42 combined with the shape and orientation of the bill 14 and the natural longitudinal axis 40 of the body 12 are such that forward tension on the line 44 (particularly with a counterweight 48 attached) will cause the lure 10 to ascend.

In operation, the position of the line-attachment eyelet 42 on a conventional lure 10 relative to the center of mass of the entire lure 10 will produce the natural longitudinal axis 40 which will be aligned with the fishing line 44 when forward tension is applied to the line 44 and lure 10, and the lure 10 will proceed to traverse along a path coextensive with that natural longitudinal axis 40. The upwardly-angled bill 14 of the lure 10 of this invention is thus positioned above the eyelet 42 at an orientation or angle such that tension applied to the eyelet 42 and directed along the natural longitudinal axis 40 will cause the lure 10 to ascend relative to that natural longitudinal axis 40 (or the particular depth commensurate with the horizontally-oriented natural longitudinal axis 40).

In addition, a counterweight 48 on the line 44 of a conventional lure 10 will normally cause the line 44 to diverge downwardly from the natural longitudinal axis 40 of that lure 10, causing the lure 10 to rotate or pitch forwardly about its center of mass to realign the natural longitudinal axis 44 with the physical path of the line 44. The upwardly angled bill 14 of the lure 10 of this invention for use with a counterweight 48 applying downward force to the line 44 is therefore similarly positioned above the eyelet 42 at an orientation such that forward tension applied to the line 44 the bill 14 creates sufficient upward force to overcome the downward force exerted by the counterweight 48 and cause the lure 10 to ascend in the water.

Figure 11:
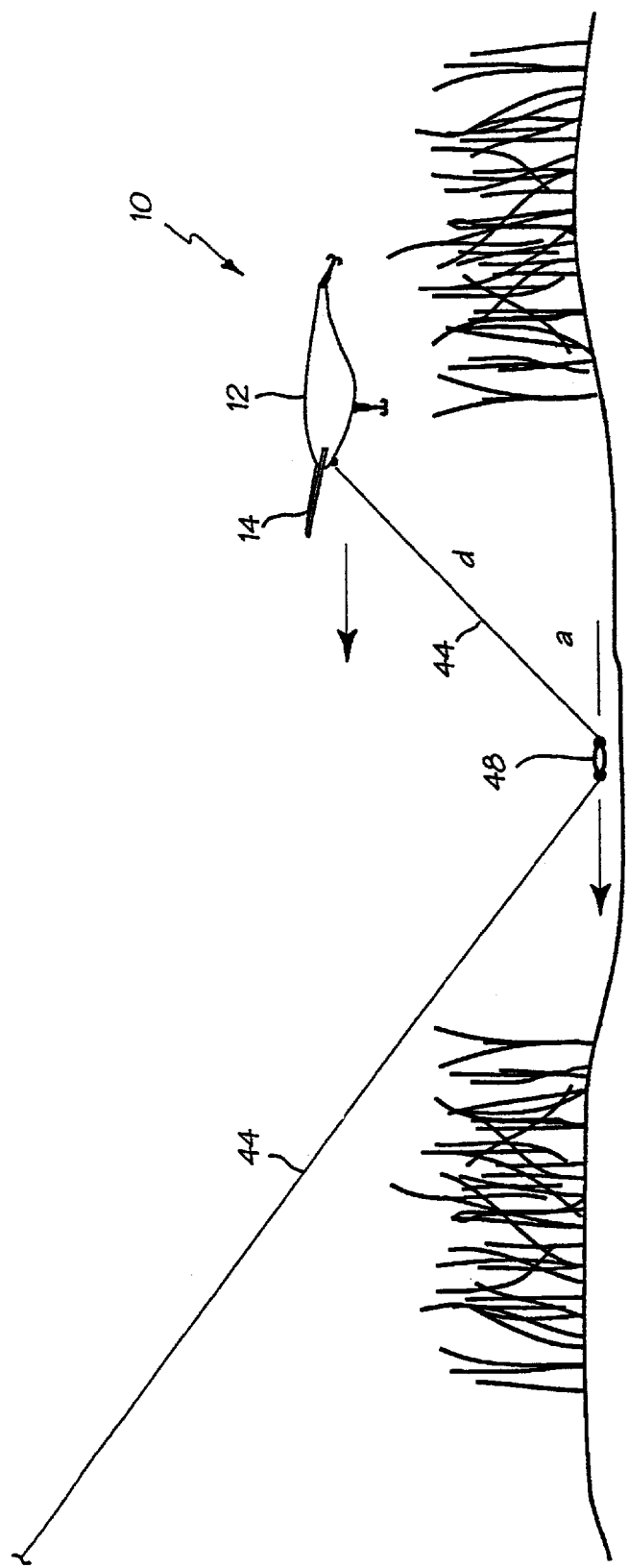
FIG. 11 is a side elevation view showin the lure of FIG. 1 being maintained at a constant depth relative to the bottom surface of a lake.

In use, the line 44 is preferably weighted with a counterweight 48, with the lure 10 being used near the bottom surface of a lake, river, or stream as shown in FIG. 11. If the counterweight 48 is set a fixed distance from the lure 10, and the counterweight 48 dragged along or near the bottom surface or bed by trolling or retreiving line 44, the lure 10 will travel at a substantially constant depth relative to the bottom determined by the distance between the counterweight 48 and the lure 10. That depth will be equal to the distance d between the counterweight 48 and the lure 10 times the sine of the angle a between the line 44 and the bottom surface, or more appropriately the path along which the counterweight 48 moves. The angle a will depend upon the tension applied to the line 44 controlling the speed at which counterweight 48 and lure 10 move through the water, and the upward force exerted by the bill 14 of the lure 10 and the bouyancy of the lure 10 itself.

It may therefore be appreciated that, as noted above, the body 12 is preferably weighted or fabricated so as to be very close to neutral bouyancy in fresh water. In addition, the configuration and weight displacement of the body 12 should be designed so that the center of mass of the body 12 and lure 10 overall is disposed so that the body 10 remains relatively close to a horizontal orientation as the lure 10 moves in the water under tension from the line 44 and the counterweight 48.

Alternately, the lure 10 may similarly be used with a counterweight 48 but more closely proximate to the surface of the water, with only slight tension being applied to the line 44 to keep the counterweight 48 below the depth of the lure 10 and balance the downward force of the counterweight 48 against the upward force of the bill 14 to maintain continuous forward motion of the lure 10, but with the tension being altered in a periodic or cyclic or motion in order to cause the lure 10 to ascend under slightly stronger tension and level off or descend due to the counterweight 48 when slightly less tension is applied, and ascend rapidly and controllably when even stronger tension is applied. Such an approach can be used to mimic a smaller fish feeding near the water's surface, preferably in calm water, and may require more practice to achieve on a consistent and uniform basis.

It will be readily understood and appreciated by those skilled in the art that a wide variety of shapes, sizes, and configurations of bills 14 may be utilized with the ascending lure 10 of this invention, as is deemed most practical and advantageous given the particular shape, dimensions, specifications, characteristics, and intended applications of the body 12 of the lure 10 as well as the line 44 and any counterweight 48 being used, and as may be dictated by or refined in light of experimental or field testing of such lures 10.

What is claimed is:

1. A fishing lure comprising:
   a body member having substantially neutral buoyancy, said body member defining a natural longitudinal axis;
   at least one hook member connected to said body member;
   a bill member connected to and extending forwardly and upwardly from said body member, the bill member having an upper surface and a lower surface and being angled upwardly at an acute angle relative to the natural longitudinal axis of the body member, the bill member adapted to exert an upwardly-directed force on the body member when the body member is moving forward in the water; and an attachment member connected directly to said body member at a position below at least one of the natural longitudinal axis of the body member and the lower surface of the bill member, the attachment member for securing a fishing line to the body member;

wherein the fishing lure is adapted to move forward and ascend in the water as a downwardly and forwardly directed force from the fishing line is applied at a point below the center of gravity of the body member.

2. A fishing lure comprising:

a body member, said body member having substantially neutral bouyancy and defining a natural longitudinal axis relative to said attachment member;

at least one hook member connected to said body member;

an attachment member connected directly to said body member at a position located below said natural longitudinal axis, the attachment member for attaching a fishing line to said body member; and a bill member connected to and extending forwardly and upwardly from said body member, said bill member being angled upwardly at an acute angle relative to said natural longitudinal axis of said body member, wherein at least a portion of the fishing line beginning at the attachment member is directed downwardly such that a line of pull is below the natural longitudinal axis and wherein an upwardly-directed force is directed on the bill member causing the fishing lure to ascend in the water.

3. The fishing lure of claim 2 wherein the body member has a generally neutral or positive buoyancy in the water and a downwardly-directed force is exerted on the fishing line and the fishing lure by a counterweight attached to the fishing line.

4. A fishing lure comprising:

a body member having substantially neutral buoyancy, and having a center of mass disposed therein such that the body member maintains a generally horizontal orientation in the water and further defining a natural longitudinal axis relative to an attachment member;

the attachment member connected directly to said body member at a position located below the natural longitudinal axis, the attachment member for attaching a distal end of the fishing line to the body member;

a bill member connected to and extending forwardly from said body member, said bill member being angled upwardly at an acute angle relative to said natural longitudinal axis of said body member; and a counterweight attached to the fishing line at a location generally displaced from the body member, the counterweight adapted to exert a downwardly-directed force on the fishing line and the body member such that at least a portion of the fishing line beginning at the attachment member is directed downwardly and forwardly of the body member causing the fishing lure to move forward in the water when tension is applied to a proximal portion of the fishing line and wherein the bill member causes an upwardly-directed force on said body member whereby the fishing lure is adapted to ascend in the water, the upwardly-directed force being sufficient to overcome the downwardly-directed force exerted on the fishing line and the fishing lure by the counterweight.

5. The fishing lure of claim 1 wherein the bill member is connected to the body member at a junction, and further wherein the attachment member for attaching the fishing line to the body member is disposed on the body member at a position displaced from and generally below said junction between the bill member and the body member.

6. The fishing lure of claim 5 wherein the body member has a distal tip and a belly segment disposed proximal to and generally below said distal tip, the junction between the bill member and the body member being disposed adjacent said distal tip, and the attachment member for attaching the fishing line to the body member being disposed adjacent said belly segment of the body member.

7. The fishing lure of claim 1 wherein the bill member defines a top side and an underside, and further wherein the attachment member for attaching the fishing line to the body member is disposed on said underside of the bill member.

8. The fishing lure of claim 1 wherein the bill member has a generally planar configuration.

9. The fishing lure of claim 8 wherein the bill member defines a generally semicircular distal end and a pair of generally straight side edges.

10. The fishing lure of claim 8 wherein the bill member has a distal end and a proximal end, said distal end having a width generally greater than said proximal end.

11. The fishing lure of claim 1 wherein the bill member has a generally Z-shaped configuration.

12. The fishing lure of claim 1 wherein the bill member comprises:

a proximal section connected to the body member;

an intermediate section connected to and extending angularly from said proximal section; and a distal section connected to and extending angularly from said intermediate section, at least said distal section being angled generally upwardly relative to the natural longitudinal axis of the body.

13. The fishing lure of claim 1 wherein the body member has a distal tip, a belly segment disposed proximal to said distal tip, and a tail segment disposed proximal to said belly segment, said belly segment having a diameter generally greater than that of said distal tip, and said distal tip having a diameter generally greater than that of said tail segment.

14. The fishing lure of claim 1 wherein the body member is fabricated from a generally solid material.

15. The fishing lure of claim 11 wherein the generally solid material is balsa wood.

16. The fishing lure of claim 1 wherein the bill member is fabricated from a plastic material.

17. The fishing lure of claim 16 wherein the generally solid material is polystyrene.

18. The fishing lure of claim 1 wherein the bill member is generally translucent in the water.

19. The fishing lure of claim 1 further comprising:

a pair of hook members connected to the body member.

20. The fishing lure of claim 1 wherein the body member has a distal tip, a belly segment disposed proximal to and generally below said distal tip, and a tail segment disposed proximal to said belly segment, the fishing lure further comprising:

a first hook member connected to the body member adjacent the belly segment; and a second hook member connected to the body member adjacent the tail segment.

21. The fishing lure of claim 1 wherein the counterweight is disposed in front of and below the fishing lure in the water.

* * * * *